H. ADLER.
HOOD FOR MOTOR BUSSES AND OTHER VEHICLES.
APPLICATION FILED OCT. 19, 1914.
1,146,745.
Patented July 13, 1915.
2 SHEETS—SHEET 1.
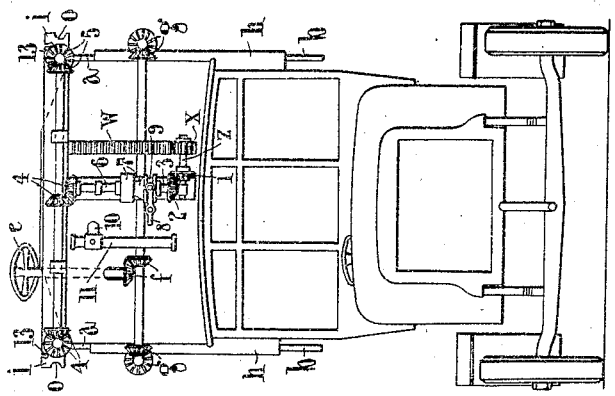
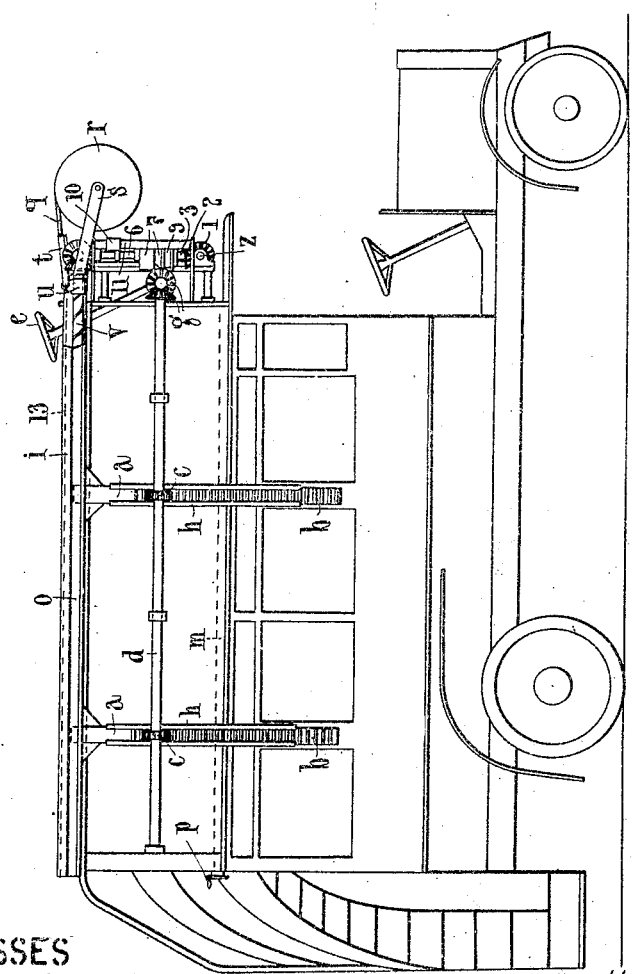
WITNESSES
INVENTOR
Harry Adler
BY
ATTORNEY H. ADLER.
HOOD FOR MOTOR BUSSES AND OTHER VEHICLES.
APPLICATION FILED OCT. 19, 1914.
1,146,745.
Patented July 13, 1915.
2 SHEETS—SHEET 2.
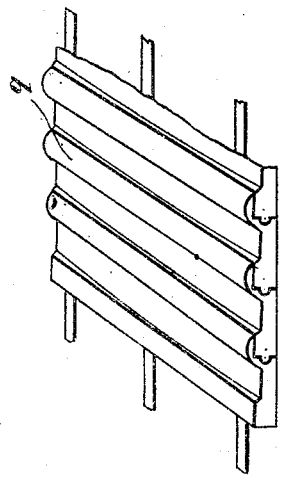
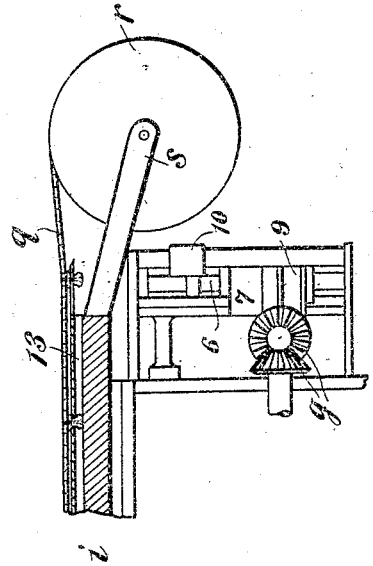
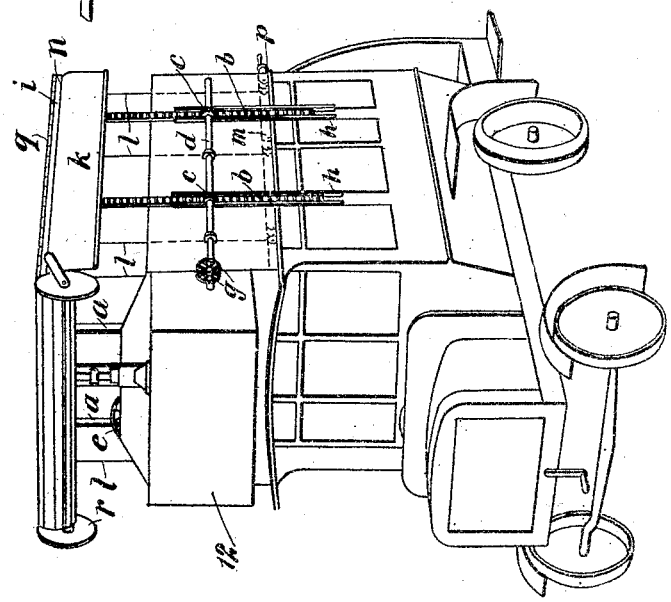
WITNESSES
Inventor:
Harry Adler
BY Munn & Co.
ATTORNEYS

UNITED STATES PATENT OFFICE.

HARRY ADLER, OF MELVILLE, JOHANNESBURG, SOUTH AFRICA.

HOOD FOR MOTOR-BUSES AND OTHER VEHICLES.

1,146,745. Specification of Letters Patent. Patented July 13, 1915.

Application filed October 19, 1914. Serial No. 867,522.

*To all whom it may concern:*

Be it known that I, HARRY ADLER, a subject of the King of Great Britain and Ireland, and residing at 32 Second avenue, Melville, Johannesburg, South Africa, have invented certain new and useful Improvements in Hoods for Motor-Buses and other Vehicles, of which the following is a specification.

This invention relates to improvements in hoods or coverings for motor-buses, motor-cars or other vehicles and has for its object to devise means which may be readily and rapidly manipulated for the purpose of protecting the upper parts of such vehicles or the passengers upon the same when required while the devices according to my invention are such that they may be readily collapsed or folded or hidden away so as not to render the vehicle unsightly in appearance or difficult to handle when the hood or covering is not required in operation.

Further advantages obtained by my invention are that the various parts are made readily adjustable so that the height of the roof or covering upon a motor-bus, for example, may be readily varied if required for passing beneath bridges, arches, or other like structures, while the effective area of the covering may also be adjusted to suit any condition of ventilation that may be required.

The invention consists primarily in a collapsible hood-like cover for motor-buses, motor-cars and other vehicles comprising independently movable side portions and a roof portion also movable independently of the side portions.

The invention also consists in a collapsible hood-like covering for motor-buses and other vehicles comprising side rails carrying movable blinds, windows or the like and one end of which supports a flexible roofing member, movable independently of the side members.

Further features of the invention and advantages derived therefrom will be readily appreciated from the following description.

The accompanying drawings illustrate two modes of carrying out the invention.

Figure 1 is a side elevation showing one convenient construction in accordance with the invention when applying the same, for example, to a motor-bus. Fig. 2 is a front elevation of the motor-bus shown in Fig. 1 with the roof member removed for the sake of clearness. Fig. 3 is a perspective view of the motor-bus illustrated in Figs. 1 and 2. Fig. 4 is a perspective view of a portion of the roof; and Fig. 5 is a side elevation partly in section and on an enlarged scale of the front portion of the improvement.

In carrying my invention into effect in one convenient manner when applying the same to motor-buses or other like vehicles intended for passenger traffic and as illustrated in Figs. 1, 2, and 3, I provide upon each side of the motor-bus or the like a movable framework or structure which may be slidably mounted in guides fixed to the framework or sides of the vehicle and which may be moved relatively thereto by any suitable means or mechanism. In one convenient construction each frame or the like may comprise guides $a$ formed with or having secured thereto suitable racks $d$ adapted to be engaged by pinions $c$ carried upon a shaft $d$ mounted upon some fixed portion of the vehicle and adapted to be driven by any suitable means controllable by the driver or conductor of the vehicle, such means either taking the form of a hand-wheel $e$ with intermediate bevel gears $f$ and $g$ or other gearing, or the same may be operated by power derived from the prime mover of the vehicle, the arrangement being such that upon rotation of the shaft $d$ in one direction or the other the rack members $b$ upon the framework are caused to slide up or down in suitable guides $h$ mounted upon the side of the vehicle.

The upper rail $i$ or like member of each side frame carries upon its exterior face a blind or series of blinds or other suitable devices to form the side coverings, such devices in the construction shown taking the form of a blind $k$ running the whole length of the vehicle, the lower end of which is attached by suitable cords $l$ to a shaft $m$ or otherwise held fixed in any suitable manner when the framework is raised so that the blind is thereby automatically drawn down from the spring roller $n$ upon which it is wound while upon releasing the holding means for the lower end of the blind the same is automatically wound upon its roller and the sides of the covering or hood will thus be left open.

The blind rollers $n$ are mounted in grooves $o$ (Fig. 2) upon the outer sides of the rails or like members $i$ in the usual manner adopted with such devices by means of brackets arranged at the ends of said rails, and to secure any degree of opening of the side blinds I arrange for the shaft $m$ to be rotatable by means of the hand-wheel $p$ or other like member controllable by the conductor or by the driver.

To make the upper protecting device thoroughly waterproof I provide the same with a roof $q$ which is preferably formed from some flexible material or in the manner of a roller shutter or blind so that the roof may be carried upon a drum or roller $r$ supported by the side frames as, for example, by means of brackets $s$ either at the front or rear end thereof.

When applying the invention to passenger vehicles I prefer to arrange the sides and roof of the structure so that they may be operable by means of the one operating device such as $e$ and with such an arrangement it is necessary that means be provided to insure that the roof shall not be drawn across into position until after the side frames have been moved to a certain height so that the process of moving the roof into position will not in any way interfere with the comfort of the passengers or with the gear for operating the sides. According to one method of attaining this object the free end of the roof is connected either directly or by means of a suitable intervening link or like connecting member $t$ to each of two nuts $u$ arranged upon the movable framework on each side of the vehicle, each nut being adapted to engage with a preferably quick pitch screw $v$ running the whole length of the vehicle and mounted within a groove upon the inner side of the side rail $i$ similar to the groove $o$ above referred to.

The shafts $v$ are adapted to be rotated by suitable gearing connected with the gearing operating the movable frames or by gearing operated by the movement of the frames, the arrangement being such that upon rotation of the screwed shafts the nuts $u$ are drawn along thereon and with them that end of the roof to which they are attached so that the roof is in this manner unwound from the drum or cylinder $r$ upon which it is carried, and as above explained it is preferred to provide means to insure that the roof shall not be moved until the side frames have reached a convenient height.

In the example illustrated in the drawings I secure to the front of the movable framework a rack $w$ (Fig. 2) adapted to engage a spur wheel $x$ mounted upon a shaft $z$ arranged in fixed bearings carried by the vehicle and having at its other end a bevel wheel 1 adapted to engage a second bevel wheel 2 mounted upon a shaft 3, the motion of which is transmitted to the shaft 6 through the clutch 7, and thence to the screwed spindles $v$ through the intervention of suitable bevel gears 4 and 5. The clutch 7 is arranged to be operative only when the framework has been raised to a certain height by means of a lever 8 loosely engaging a grooved collar 9 upon one clutch member which as the whole device rises, comes into contact with a fixed projection or stop 10 carried by the motor-bus or the like so that the outer end of the pivoted lever 8 is depressed and the clutch members forced into engagement with one another whereupon the roof is drawn rapidly into position owing to the quick pitched thread upon the screwed spindle $v$, and for the purpose of adjusting the point at which the roof is drawn into position the fixed bracket or the like 11 carrying the stop 10, may be provided with apertures or notches, or may be otherwise suitably formed to allow of the adjustment of the stop 10, in relation thereto. The whole of the gear above described may, if desired, be inclosed by a suitable casing or the like, 12, as shown in Fig. 4.

The roof $q$ may be formed from interlocking laths or like members of wood, metal, or other suitable material preferably formed with suitable tongues and grooves and which may have overhung portions so that the overhanging portion of one member may rest upon the corresponding horizontal portion of the next member when the whole are arranged in position, and cork, rubber, or other suitable material may be interposed between the members for the purpose of forming the weather-tight joint it being also desirable to form the roof whether made from rigid members or from flexible material slightly rounded transversely so as to obviate the risk of any water collecting thereon and when laths or like members are employed these may be formed upon their upper surface with cambered grooves or recesses running the whole length of each lath. The rigid members may be mounted upon steel tapes, canvas webbing or other suitable flexible material and, if desired, the under-side of the roof may be arranged to bear advertising matter or any other matter which it may be desirable to display within the interior of the vehicle.

For the purpose of facilitating the working of the roof some or all of the members forming the same may be provided with rollers or like anti-friction devices adapted to engage slots, 13, in the upper surface of the side rails $i$ and suitable steel springs or other guides may be fitted at that end of the rail adjacent the roof for the purpose of guiding the latter into the slots 13, while the rails themselves may, if desired, be provided with holes at suitable intervals so that any rubbish or refuse collecting in the slots 13 may be swept therefrom and out through the apertures referred to during the movement of the roof.

Having now described my invention what I claim as new and desire to secure by Letters Patent is:—

1. A collapsible hood or like covering for motor and other vehicles comprising a movable framework upon each side of the vehicle, an independently movable roof member and means for moving the roof member into position automatically at a certain point in the movement of the side frameworks.

2. A collapsible hood or like covering for motor or other vehicles comprising movable side rails carrying movable side coverings, an independently movable roof member and means for moving the roof member into position automatically at a predetermined point in the movement of the side rails.

3. A collapsible hood or like covering for motor and other vehicles comprising movable side rails carrying movable side coverings, an independently movable roof member, means for moving the roof member into position automatically at a predetermined point in the movement of the side rails and means for varying the point at which the roof member is adapted to be moved into position automatically.

4. A collapsible hood or the like covering for motor or other vehicles comprising movable side rails carrying movable side coverings, means for moving the roof member into position automatically at a certain point in the movement of the side portions, and means for varying the point at which the roofing member is adapted to be moved into position automatically.

5. A collapsible hood or the like covering for motor or other vehicles comprising a movable framework upon each side of the vehicle, means for raising and lowering the framework, side blinds carried by each framework having their lower ends secured in an adjustable manner, a flexible roofing carried upon a drum supported by said frameworks and means for moving said roofing into position.

6. A collapsible hood or the like covering for motor or other vehicles comprising a movable framework upon each side of the vehicle, means for raising and lowering the framework, side blinds carried by each framework having their lower ends secured in an adjustable manner, a flexible roofing carried upon a drum supported by said frameworks, and means for automatically moving the roof into position when the side frames have been raised to a certain height.

7. A collapsible hood or the like covering for motor or other vehicles comprising a movable framework upon each side of the vehicle, means for raising and lowering the framework, side blinds carried by each framework having their lower ends secured in an adjustable manner, a flexible roofing carried upon a drum supported by said frameworks, and screw-threaded rotatable shafts adapted to engage nuts secured to the flexible roofing.

8. A collapsible hood or the like covering for motor or other vehicles comprising a movable framework upon each side of the vehicle, means for raising and lowering the framework, side blinds carried by each framework having their lower ends secured in an adjustable manner, a flexible roofing carried upon a drum supported by said frameworks, screw-threaded rotatable shafts adapted to engage nuts secured to the flexible roofing, and gearing operated by the movement of the side frames for rotating the screwed shafts.

9. A collapsible hood or the like covering for motor or other vehicles comprising a movable framework upon each side of the vehicle, means for raising and lowering the framework, side blinds carried by each framework having their lower ends secured in an adjustable manner, a flexible roofing carried upon a drum supported by said frameworks, means for moving said roofing into position when the side frames have been moved to a certain height, and means for varying the point at which said roofing is adapted to be moved into position.

10. A collapsible hood or like covering for motor or other vehicles comprising movable side rails, guides for said rails, racks carried by said guides, pinions to raise or lower said racks, means to operate said pinions, a flexible roofing member, a drum mounted at one end of said side rails for receiving said roof member, and gearing adapted to operate said flexible roof member at a predetermined point in the movement of said side rails.

11. A collapsible hood or like covering for motor or other vehicles comprising movable side rails, means for raising or lowering said side rails, a flexible roofing comprising rigid members mounted upon suitable flexible material, a drum on which said flexible roofing is wound and gearing adapted to operate said flexible roofing at a predetermined point in the movement of the side rails.

12. A collapsible hood or the like covering for motor or other vehicles comprising a movable framework upon each side of the vehicle, means for raising and lowering the framework, side blinds carried by each framework having their lower ends secured in an adjustable manner, a flexible roofing carried upon a drum supported by said frameworks, screw-threaded rotatable shafts adapted to engage nuts secured to the flexible roofing, gearing operated by the movement of the side frames for rotating the screwed shafts, a clutch in said gearing and adjustable means for rendering said clutch operative when the side frames have been raised to a certain height.

13. A collapsible hood or the like covering for motor or other vehicles comprising movable side portions, means for raising or lowering said side portions, a flexible roofing portion, a drum mounted at one end of said side members, said drum being adapted to receive the flexible roofing member, means for operating said roofing member, and anti-friction members upon the roofing member adapted to engage guides formed in the side frames.

14. A collapsible hood or the like covering for motor or other vehicles comprising movable side portions, side blinds attached thereto, means for raising or lowering said side portion, independent means for raising or lowering said blinds, a flexible roofing, a drum mounted at one end of said side members, said drum being adapted to receive a flexible roofing member, means for operating said roofing and anti-friction members upon the roofing adapted to engage guides formed in the side frames.

15. A collapsible hood or the like covering for motor or other vehicles comprising movable side portions, means for raising or lowering said side portions, means for raising or lowering said blinds automatically as the side portions are lowered or raised, a flexible roofing member, a drum mounted at one end of said side members, said drum being adapted to receive the flexible roofing member, means for operating said roofing, and anti-friction members upon the roofing adapted to engage guides formed in the side frames.

In testimony whereof I have signed my name to this specification in the presence of two subscribing witnesses.

HARRY ADLER.

Witnesses:
 WILLIAM JAMES MADDEN,
 HARRY SYDNEY HENSON.